(12) United States Patent
Matthews

(10) Patent No.: US 7,578,524 B1
(45) Date of Patent: Aug. 25, 2009

(54) PERSONAL RECREATION/UTILITY VEHICLE LIFT AND ANTI-THEFT DEVICE

(76) Inventor: William J Matthews, 8335 Tubbs Branch Rd., Sebring, FL (US) 33876

( * ) Notice: Subject to any disclaimer, the term of this patent is extended or adjusted under 35 U.S.C. 154(b) by 250 days.

(21) Appl. No.: 11/818,769

(22) Filed: Jun. 15, 2007

(51) Int. Cl.
B60S 9/22 (2006.01)

(52) U.S. Cl. .................. 280/763.1; 188/5; 224/519; 248/551

(58) Field of Classification Search ........... 280/763.1, 280/507; 188/5, 6, 7; 254/419; 248/551
See application file for complete search history.

(56) References Cited

U.S. PATENT DOCUMENTS

| 2,931,525 | A | * | 4/1960 | Davis | 414/686 |
|---|---|---|---|---|---|
| 3,785,541 | A | * | 1/1974 | Sibley | 224/408 |
| 4,522,420 | A | * | 6/1985 | Hannappel | 280/755 |
| 5,421,611 | A | * | 6/1995 | Peterson et al. | 280/763.1 |
| 5,431,254 | A | * | 7/1995 | Kramer et al. | 188/7 |
| 5,497,969 | A | | 3/1996 | Broughton | |
| 5,593,260 | A | | 1/1997 | Zimmerman | |
| 5,599,002 | A | * | 2/1997 | Knutson | 248/552 |
| 5,662,451 | A | * | 9/1997 | Muzzi et al. | 414/540 |
| 5,749,697 | A | * | 5/1998 | Davis | 414/680 |
| 6,036,417 | A | * | 3/2000 | Weaver | 410/7 |
| 6,155,771 | A | * | 12/2000 | Montz | 414/543 |
| 6,450,472 | B1 | * | 9/2002 | Cook, Jr. | 248/551 |
| 6,454,285 | B1 | * | 9/2002 | Koenig | 280/250.1 |
| 6,626,748 | B2 | * | 9/2003 | Homer, Sr. | 452/189 |
| 6,698,995 | B1 | * | 3/2004 | Bik et al. | 414/462 |
| 6,921,007 | B1 | * | 7/2005 | Guerrant | 224/519 |
| 7,097,408 | B2 | * | 8/2006 | Paxton | 414/462 |
| 7,101,142 | B2 | * | 9/2006 | Bik et al. | 414/462 |
| 7,111,765 | B1 | * | 9/2006 | Blakley | 224/506 |
| 7,147,415 | B2 | | 12/2006 | Rorie et al. | |
| 7,419,347 | B1 | * | 9/2008 | Cormier | 414/462 |

* cited by examiner

Primary Examiner—Jeffrey J Restifo
(74) Attorney, Agent, or Firm—Charles J. Prescott

(57) ABSTRACT

A land based recreation and utility vehicle lift and anti-theft device and system. The device includes an elongated support post including a ground-engaging fulcrum connected to, and laterally offset in one direction from, the lower end of the support post. A first pivotal connection of the support post is positioned laterally therefrom in the opposite direction from the fulcrum and adapted for pivotal connection to a drawbar or tubular member of the PRV. A locking bar is also pivotally connected at one end to the support post and preferably connectable at the other end to the drawbar or frame member at a point spaced from the first pivotal connection after the corresponding end of the vehicle is lifted from contact with the support surface by pivotal movement of the support post about the fulcrum whereby the lifted end of the vehicle is maintained in a lifted position for service and as a theft deterrent.

5 Claims, 3 Drawing Sheets

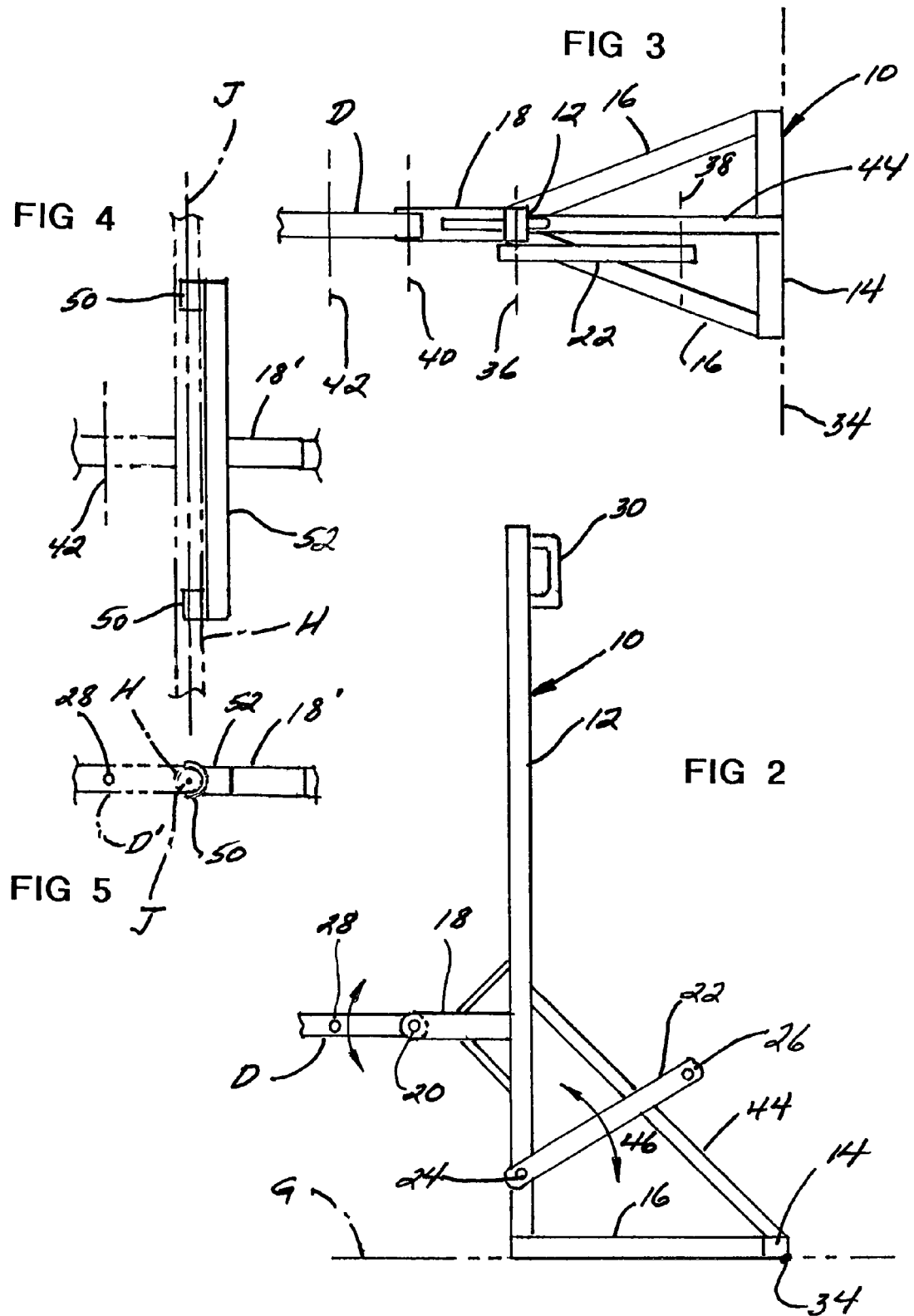

PERSONAL RECREATION/UTILITY VEHICLE LIFT AND ANTI-THEFT DEVICE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to devices attachable to one end or the other of a personal recreational and utility vehicle (PRV) such as a snowmobile, a 3 or 4 large-wheeled ATV and the like, and more particularly to such a device and system which will elevate one end of such a vehicle for maintenance and for anti-theft purposes.

2. Description of Related Art

The use of off-road type land-based personal recreation and utility vehicles (PRVs) has obviously become extremely popular. Such vehicles include snowmobiles and various personal all terrain recreation and utility vehicles which enable off-road transport and recreation of one or two persons in virtually all weather and ground conditions. However, when not in use and not lockably deployed on a trailer or within a building, such PRVs have become extremely susceptible to theft. When sitting alone or unattended in a generally unlocked situation, two or more thieves may easily roll, then lift, or simply "hot wire" and drive such recreational vehicles away or into a tow or haul vehicle in a matter of moments without much risk of being caught or seen.

Moreover, the servicing of such vehicles is somewhat difficult wherein, for example, the rear axle of a land-based wheel supported recreational vehicle must be serviced either to maintain or repair drive train or substructure or simply replace tires when worn or requiring exchange. As these vehicles may weigh several hundred pounds, although still remaining easily subject to thieves as above described, nonetheless holding one end of such a vehicle above ground for any length of time during servicing is at best extremely difficult.

U.S. Pat. No. 6,036,417 to Weaver teaches a stabilizing arm including a support pivotally, rotatably or slidably disposed in the support sleeve fitted to a conventional trailer hitch. A releasable locking apparatus for locking together support posts and a drawbar of a vehicle for prevention of theft is disclosed in U.S. Pat. No. 5,497,969 to Broughton.

An anti-theft device attachable to a snowmobile is disclosed in U.S. Pat. No. 5,599,002 to Knutson and Rorie, et al. discloses an apparatus for securing a recreational vehicle to a towing vehicle or to a grounding member in U.S. Pat. No. 7,147,415. U.S. Pat. No. 5,593,260 to Zimmerman teaches an apparatus having a lift bar for securing an ATV to a trailer.

The foregoing examples of the related art and limitations related therewith are intended to be illustrative and not exclusive. Other limitations of the related art will become apparent to those skilled in the art upon a reading of the specification and a study of the drawings.

The present invention provides a manually actuated device for easily lifting one axle or end of any compatible land-based recreational or utility vehicle for servicing of the associated components, drive train and wheels thereof. Once deployed, the device will maintain the elevated positioning of the axle, wheels and corresponding end of the PRV while servicing thereof is completed. By adding a locking feature to the connectable pivot points of the device, the anti-theft feature of the invention is thereby deployed wherein the elevated wheels and axles or snowmobile drive belt of the PRV being raised from contact with the ground or other support surface cannot be easily stolen or at least driven away by bypassing a key actuated ignition system, for example.

BRIEF SUMMARY OF THE INVENTION

This invention is directed to a land based recreation vehicle lift and anti-theft device and system, the vehicle having a drawbar or transverse tubular member for attachment thereto. The device includes an elongated support post including a vehicle support surface engaging fulcrum connected to, and laterally offset in one direction from, the lower end of the support post when in use. A first pivotal connection of the support post is positioned laterally therefrom in another direction opposite that of the fulcrum and is spaced above the lower end and adapted for pivotal connection to the drawbar or tubular member. A locking bar is pivotally connected at one end thereof to the support post above the lower end, a free end of the locking bar being connectable, preferably lockably, to the drawbar or frame member of the vehicle at a point spaced from the first pivotal connection when the corresponding end of the vehicle is lifted from contact with the support surface by pivotal movement of the support post about the fulcrum away from the vehicle whereby the lifted end of the vehicle is preferably lockingly maintained in a lifted position for service and as a theft deterrent.

It is therefore an object of this invention to provide an anti-theft and lifting device for land-based recreational and utility wheeled and belt-driven vehicles (PRVs).

Still another object of this invention is to provide a device which completely elevates one drive axle of a multi-axle land-based recreational vehicle to completely separate the drive wheels from the ground or other support surface.

Yet another object of this invention is to utilize an existing drawbar of a land-based personal recreational vehicle for attachment of a device which will elevate one end of the recreational vehicle for serviceability and anti-theft purposes.

The following embodiments and aspects thereof are described and illustrated in conjunction with systems, tools and methods which are meant to be exemplary and illustrative and not limiting in scope. In various embodiments, one or more of the above-described problems have been reduced or eliminated while other embodiments are directed to other improvements. In addition to the exemplary aspects and embodiments described above, further aspects and embodiments will become apparent by reference of the drawings and by study of the following descriptions.

BRIEF DESCRIPTION OF THE SEVERAL VIEWS OF THE DRAWING(S)

FIG. 2 is a side elevation view of the invention of FIG. 1.

FIG. 3 is a top plan view of FIG. 2.

FIG. 4 is a top plan view of a portion of an alternate embodiment of the first pivotal connection of the invention.

FIG. 5 is a side elevation view of FIG. 4.

Exemplary embodiments are illustrated in reference figures of the drawings. It is intended that the embodiments and figures disclosed herein are to be considered to illustrative rather than limiting.

DETAILED DESCRIPTION OF THE INVENTION

Figure 1:
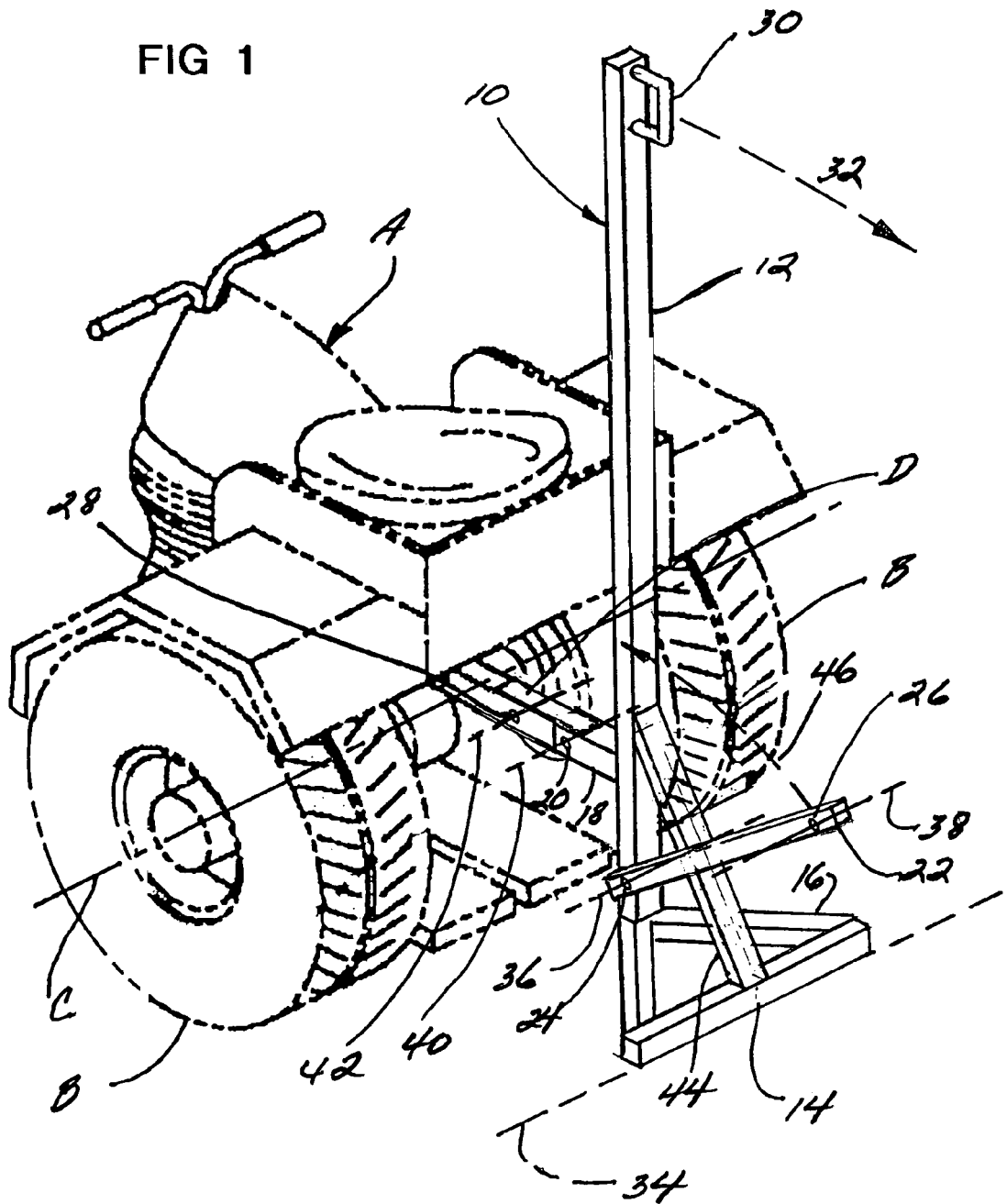
FIG. 1 is a perspective view of a rear drive portion of a typical conventional land-based wheeled personal recreational vehicle (PRV) in phantom, showing the device rearwardly positioned and attached to the vehicle ready for deployment.

Referring now to the drawings, the device is there shown generally at numeral 10 deployed and ready for use as seen in FIG. 1 immediately adjacent the rear of a land-based personal wheeled recreational vehicle (PRV) shown generally at numeral A and as part of the system of the invention. This PRV A includes spaced wide ground flotation-type rear wheels B operably mounted to the chassis engine and drive train and rotatable about a transverse axis C passing through this rear wheel arrangement. For towing purposes, this PRV A includes a drawbar D centrally located and longitudinally extending rearwardly for connection to a conventional trailer hitch or other towing arrangement.

The device 10 includes an upright elongated support post 12 made of tubular channel material for light-weight rigidity and having laterally extending frame members 16 connected at the lower end of the support post 12 extending orthogonally rearwardly to a transverse fulcrum bar 14 which defines an outer fulcrum edge 34. A diagonal brace 44 extending between the fulcrum bar 14 and a mid point of the support post 12 is provided for added rigidity and strength.

The device 10 also includes a drawbar connecting member 18 which is connected to just below a mid point of the support post 12 which laterally extends forwardly with respect to the PRV in an opposite direction to that of the fulcrum bar 14. A distal end of the drawbar connecting member 18, a mating pivotal connection is adapted for pivotal connection at 20 to the rear or distal end of the drawbar D about a first pivotal axis 40. This pivotal connection 20 may be in the form of a transverse pin locked in place or a conventional lockable trailer ball and socket arrangement which affords the pivotal connection function at this first pivotal connection 20 about the transverse axis 40 seen in FIGS. 1 and 3.

The device 10 further includes a locking bar 22 which is pivotally connected by a threaded bolt and locking nut at one end 24 thereof transversely to the upright support post 12 just above the ground or vehicle support surface G. This locking bar 22 is pivotally movable in the direction of arrow 46 about a second pivotal axis 36 and includes a connecting aperture 26 formed transversely to the distal end thereof. A pulling handle 30 is attached adjacent the upper end of the support post 12 for added leverage in manual grasping thereof during deployment of the device 10 as will be described herebelow.

Figure 6:
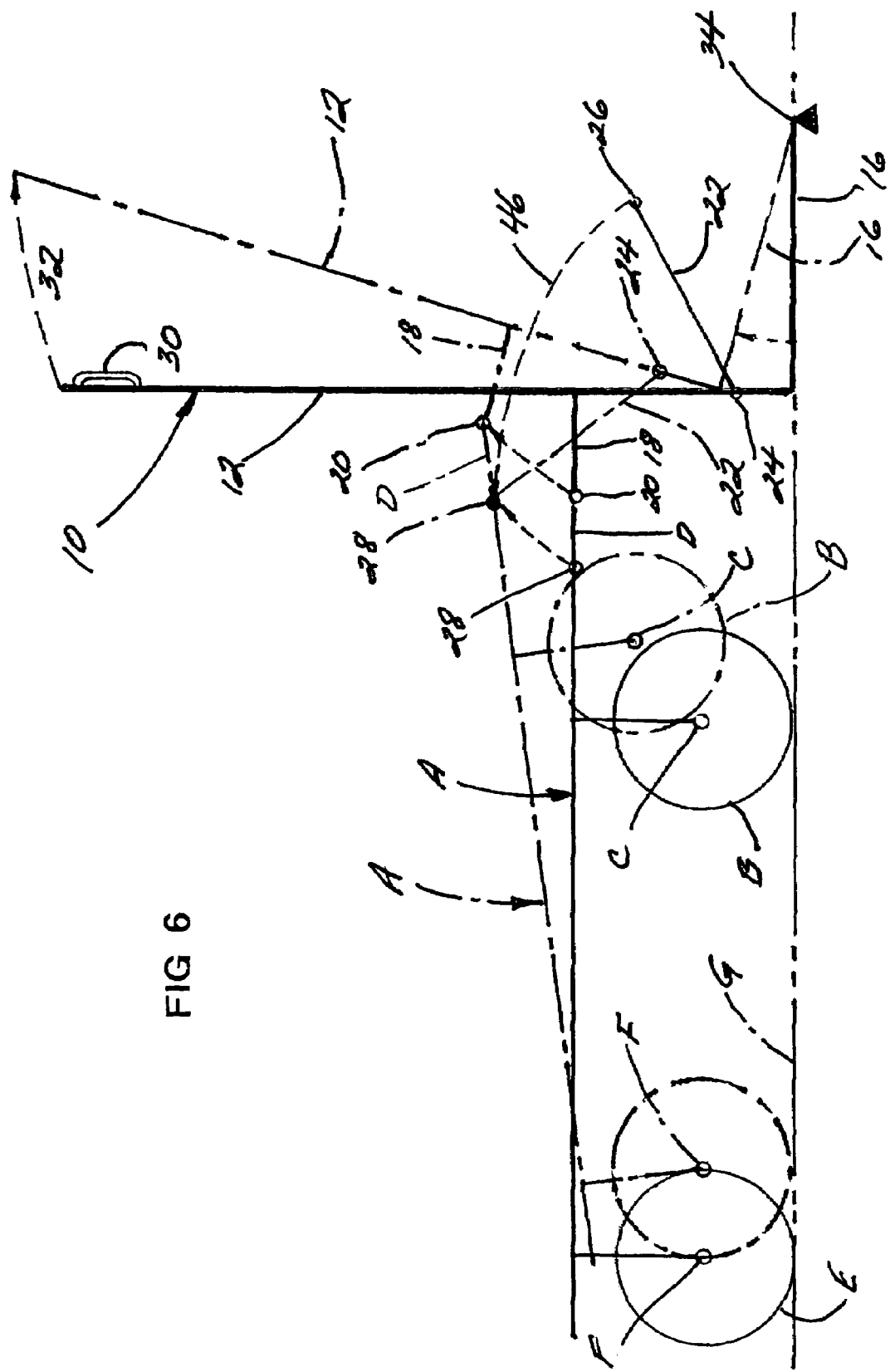
FIG. 6 is a simplified schematic view of the invention shown in solid lines prior to deployment and in phantom lines after being deployed.

As best seen in FIG. 6, after the pivotal connection is made at 20 between the distal rear end of the drawbar D and the drawbar connecting member 18 about transverse axis 40 to establish the first pivotal connection 20, the device 10 will rest atop the ground G as shown in solid lines. To elevate the rear wheels B and axis C of the PRV A, handle 30 is grasped and pulled arcuately rearwardly in the direction of arrow 32. The pre-established movement produced by the pivotal rearward movement of the upper end of the support post 12 will be the pivoting of the fulcrum bar 14 about the fulcrum line 34 which causes the entire device 10 to move into the pre-established position shown in phantom in FIG. 6.

The first pivotal connection 20 develops an angular rather than a linear relationship between the drawbar connecting member 18 and the drawbar D and the PRV A experiences a lifting and rearward movement of the rear wheels B and a rearward movement of the front wheels E which maintain contact with the ground G. At a predetermined angular movement of the device 10, the locking bar 22 may be pivoted about the second pivotal connection 24 in the direction of arrow 46 to align the aperture 26 with a transverse aperture 28 formed into the drawbar D adjacent the distal end thereof. A pin (not shown) is slid through the aligned apertures 26 and 28 at which time the handle 30 may be released and the lifted orientation of the rear wheels V will be thereby maintained with the entire weight of the rear portion of the PRV previously carried on wheels E now being carried along the fulcrum 34 and the fulcrum bar 14.

In this elevated configuration and deployed position of the device 10, maintenance activity on the rear portion of the PRV may be effected. Tires B may be changed, axle oil replenished, brakes serviced and the like. To implement the anti-theft aspect of this disclosure, the pins utilized at the first and second pivotal connections 20 and 24 may be in the form of either elongated hasps of locks or non-removable threaded bolts or pins so that the elevated arrangement shown in phantom in FIG. 6 may not be disturbed except by someone having the necessary unlocking key or combination or tool to remove one of these pins at 28, 20 or 24. Preferably, the primary aspect in maintaining the elevated and locked deployment of the device 10 is at the pinned connection at 28 between the drawbar D and the distal end of the locking bar 22.

Referring now to FIGS. 4 and 5, in lieu of connection to an existing drawbar D of a PRV as previously described, many such vehicles include a transverse bumper shown in phantom at H connected to either the front or rear of the PRV. Moreover, typically these tubular bumpers H are round or circular in cross section for manufacturing convenience and uniform strength. The drawbar connecting member is accordingly modified at 18' to be connectively supporting a transverse attaching bar 52 which includes flexible arcuate collars 50 attached to each end of the lifting bar 52 and laterally extending therefrom. These arcuate collars 50 snappingly engage over the tubular bumper H to establish the first pivotal connection about axis J. A separate transverse aperture 28 is established through the support frame D' for the transverse bumper H so that the locking bar 22 may be pivotally pinned as previously described once the end portion of the PRV has been elevated.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A land based recreation vehicle lift and anti-theft device, the vehicle having a drawbar, comprising:
   an elongated support post including a vehicle support surface engaging fulcrum connected to, and laterally offset in one direction from, a lower end of said support post when in use;

a drawbar connecting member connected to said support post and laterally extending therefrom in another direction opposite that of said fulcrum, a distal end of said connecting member spaced above said lower end and being adapted for pivotal connection to a distal end of the drawbar about a first pivotal axis;

a locking bar pivotally connected at one end thereof to said support post about a second pivotal axis positioned above said lower end, a free end of said locking bar being connectable to the drawbar at a point spaced from said first pivotal axis when the drawbar and corresponding end of the vehicle are lifted from contact with the support surface a predetermined distance by pivotal movement of said support post about said fulcrum away from the vehicle whereby the lifted end of the vehicle is maintained in a lifted position.

2. A land based recreation vehicle lift and anti-theft device, the vehicle having a drawbar, comprising:

an elongated L-shaped support member including a vehicle support surface engaging leg defining a fulcrum connected to, and laterally offset in one direction from, a lower end of an elongated upright post of said support member;

a drawbar connecting member connected to said support post and laterally extending therefrom in another direction opposite that of said fulcrum, a distal end of said connecting member spaced above said lower end and being adapted for locked pivotal connection to a distal end of the drawbar about a first pivotal axis;

an elongated locking bar pivotally connected at one end thereof to said support post at a point about a second pivotal axis positioned above said lower end, a free end of said locking bar being lockingly connectable to the drawbar at a point spaced from said first pivotal axis when the drawbar and corresponding end of the vehicle are lifted from contact with the support surface a predetermined distance by pivotal movement of said support post about said fulcrum away from the vehicle whereby the lifted end of the vehicle is lockingly maintained in a lifted position.

3. A land based recreation vehicle lift and anti-theft device, the vehicle having a frame or bumper, said device comprising:

an elongated L-shaped support member including a vehicle support surface engaging horizontal leg defining a fulcrum connected to, and laterally offset in one direction from, a lower end of an upright support post of said support member;

a first pivotal connection of said support post laterally offset therefrom in another direction opposite that of said fulcrum, said first pivotal connecting being spaced above said lower end and being adapted for pivotal connection to or adjacent to the frame or bumper about said first pivotal axis;

an elongated locking bar pivotally connected at one end thereof to said support post about a second pivotal axis positioned between said lower end and said first pivotal connection, a free end of said locking bar being connectable to the frame or bumper at a point spaced from said first pivotal axis when the corresponding end of the vehicle is lifted from contact with the support surface by pivotal movement of said support post about said fulcrum whereby one end of the vehicle is maintained lifted.

4. A lift and anti-theft system comprising:

a land based recreation vehicle having a drawbar;

an elongated support post including a vehicle support surface engaging fulcrum connected to, and laterally offset in one direction from, a lower end of said support post when in use;

a first pivotal connection of said support post laterally offset therefrom in another direction opposite that of said fulcrum, said first pivotal connection being spaced above said lower end and being adapted for pivotal connection to or adjacent to a distal end of the drawbar about a first pivotal axis of said first pivotal connection;

a locking bar pivotally connected at one end thereof to said support post about a second pivotal axis positioned above said lower end, a free end of said locking bar being connectable to the drawbar at a point spaced from said first pivotal axis when the drawbar and corresponding end of the vehicle are lifted from contact with the support surface by pivotal movement of said support post about said fulcrum whereby one end of the vehicle is maintained lifted.

5. A land based recreation vehicle lift and anti-theft device, the vehicle having a transverse tubular member positioned across one end of the vehicle, said device comprising:

an elongated support post including a vehicle support surface engaging fulcrum connected to, and laterally offset in one direction from, a lower end of said support post when in use;

a first pivotal connection of said support post and laterally extending therefrom in another direction opposite that of said fulcrum, said first pivotal connection spaced above said lower end and being adapted for locking pivotal connection to the tubular member about a first transverse pivotal axis;

a locking bar pivotally connected at one end thereof to said support post about a transverse second pivotal axis positioned above said lower end, a free end of said locking bar being lockingly connectable to the tubular member at a point spaced from said first pivotal axis when the corresponding end of the vehicle is lifted from contact with the support surface by pivotal movement of said support post about said fulcrum away from the vehicle whereby the lifted end of the vehicle is maintained in a lifted position.

\* \* \* \* \*